(12) United States Patent
Bratt et al.

(10) Patent No.: US 7,995,272 B2
(45) Date of Patent: Aug. 9, 2011

(54) FIXED FOCUS MICROSCOPE OBJECTIVE LENS

(76) Inventors: Nicholas E Bratt, Edmonds, WA (US); Chace H Fadlovich, Bothell, WA (US); David W Rush, Sammamish, WA (US)

( * ) Notice: Subject to any disclaimer, the term of this patent is extended or adjusted under 35 U.S.C. 154(b) by 387 days.

(21) Appl. No.: 12/170,434

(22) Filed: Jul. 10, 2008

(65) Prior Publication Data

US 2009/0015913 A1    Jan. 15, 2009

Related U.S. Application Data

(60) Provisional application No. 60/959,009, filed on Jul. 11, 2007.

(51) Int. Cl.
*G02B 21/26* (2006.01)
(52) U.S. Cl. ........................................ 359/391
(58) Field of Classification Search .................. 359/368, 359/391
See application file for complete search history.

(56) References Cited

U.S. PATENT DOCUMENTS

| | | | | |
|---|---|---|---|---|
| 5,870,223 | A * | 2/1999 | Tomimatsu | 359/392 |
| 2004/0236183 | A1* | 11/2004 | Durell | 600/173 |
| 2005/0111088 | A1* | 5/2005 | Winterot et al. | 359/368 |
| 2006/0280404 | A1* | 12/2006 | Kennedy et al. | 385/31 |
| 2010/0027109 | A1* | 2/2010 | Liebel et al. | 359/381 |

* cited by examiner

*Primary Examiner* — Alessandro Amari

(57) ABSTRACT

A fixed focus microscope objective lens designed for high magnification viewing of homogenous specimens. The fixed focus microscope objective comprises a last surface 16 which serves as a specimen mount and enables the device to operate in focus without the need for focus adjustors in the microscope system. The user can observe specimens by simply placing a sample of the specimen on the fixed focus objective lens surface 16. There is no need for preparing a microscope slide, focusing, or positioning the specimen. By eliminating focus and stage adjustors the microscope becomes both simpler to operate and less expensive to manufacture. A fixed focus microscope objective lens can be used by novice microscopists to obtain high quality images at high magnification for nominal cost, and can convert a common video camera into a high quality video microscope.

1 Claim, 1 Drawing Sheet

FIXED FOCUS MICROSCOPE OBJECTIVE LENS

CROSS-REFERENCE TO RELATED APPLICATIONS

U.S. Provisional Patent Application 60/959,009; Filed Jul. 11, 2007

FEDERALLY SPONSORED RESEARCH OR DEVELOPMENT

Not Applicable

SEQUENCE LISTING

Not Applicable

BACKGROUND OF THE INVENTION

This invention relates to microscopes, specifically to microscope objective lenses designed for viewing specimens at high optical magnification.

Microscopes can be complicated and expensive, especially the highest magnification systems. These microscopes typically employ high precision mechanical stages which allow the user to adjust the focus, specimen location, optical configuration, and lighting. This adjustability is generally advantageous, but for some classes of specimen, adjustable stages are actually a disadvantage. In certain circumstances, where the specimen is homogenous or close to homogenous, it is not necessary to scan the specimen for areas of interest or to focus at different locations because the view is nominally the same in all locations. Homogenous subjects can be specimens such as blood and semen that are collections of a large number of small elements suspended in a medium having essentially identical properties throughout. In this case, it is advantageous to simplify the microscope by removing the high precision mechanical stages because they are not necessary, and only burden the user with excessive cost and complexity. High magnification microscopes without complicated mechanical adjustors are much more suited for individuals untrained in microscopy, and can cost considerably less while being significantly more convenient to use.

A frustration of high optical magnification microscopes that employ a mechanically adjustable stage and adjustable lighting sources is the time required to manipulate the optical elements, locate the specimen, and find the focus. In many uses of these microscopes, it is an advantage to simplify the adjustments of the optical elements by using objectives lenses and viewing devices that are preset for optimal viewing, thereby decreasing the time needed to observe the specimen. Adjustability can also be discarded by removing the variability that the human eye adds to the microscope system, and this can be done with the use of a video camera.

Recording microscope images to video tape or to computer file usually requires complex camera, lens, and computer interface mechanisms designed specifically for the microscope and it takes additional time to adjust the focus and optical path elements. In certain circumstances, it is an advantage to utilize generally available video camcorders, with high quality optical and digital magnification capabilities and computer/TV interfacing features. This simplifies the operations required by the user to view, capture and transfer the microscope images thereby reducing the costs and complexity of producing a good quality record of the microscope image.

In conclusion, no microscope system formerly developed provides economical high optical magnification and image capturing without precision mechanical stages.

SUMMARY OF THE INVENTION

In accordance with the invention, the fixed focus microscope objective lens is constricted with the last optical surface in the focal plane so that any object, or fluid, that is applied on that last optical surface is in the focal plane of the objective lens system. It is, therefore, unnecessary to provide the user with a means to adjust the position of the sample to bring it into focus. Every time a specimen is applied, it is automatically positioned precisely in the focal plane of the objective lens. This configuration eliminates the need for adjusting, or focusing the microscope. The objective lens is preset in production to work in conjunction with eyepieces or camera systems that are infinity corrected. This greatly reduces the number of moving parts in the microscope and simplifies the operation of the device. As a result, this microscope is less expensive to make and easier to use.

Microscope objectives are normally subcomponents of a conventional microscope system, and historically objectives were used in conjunction with an eyepiece, but it is now common that a microscope is fitted with a camera. This fixed focus objective is especially well suited for use in conjunction with digital video or still cameras. These cameras can be used with the fixed focus objective to create a microscope system. Since consumer cameras are designed to focus at infinity and the fixed focus microscope objective is set at the infinite conjugate, this system can make a good image of any specimen located on the last surface of the fixed focus objective lens.

DETAILED DESCRIPTION OF THE INVENTION

Figure 1:
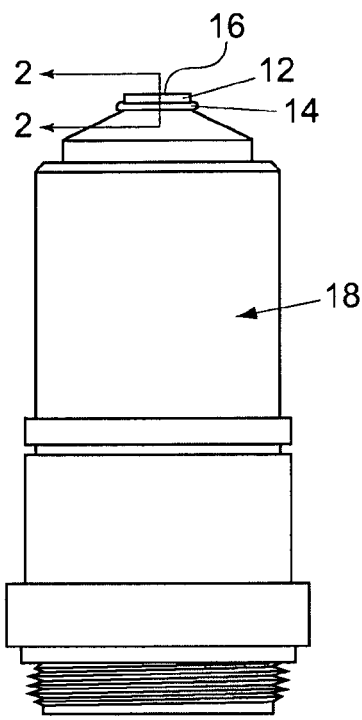
FIG. 1 is a side view of a 100× fixed focus objective constructed in accordance with the invention showing it built by modifying a common 100× oil emersion microscope objective.

FIG. 1 is a side view of a standard 100× oil emersion microscope objective lens 18 completed with a thin (approximately 150 micron thick) glass plane parallel window 12 that is fixed in place with an optically clear adhesive 14 to create the fixed focus microscope objective lens. The glass window surface 16 is located precisely at the focal plane of the objective lens 18 so that an image of an object placed on the window surface 16 is imaged at an infinite distance. It is necessary to place and affix the window 12 with extreme accuracy. The tolerance for error in this placement is no more than a few microns. This manufacturing step in the construction of the fixed focus microscope lens can be accomplished by positioning the window 12 while observing through the objective 18 an object such as a 5-micron diameter microsphere on the window surface 16 with a video camera system focused precisely at infinity. The window 12 position is actively aligned and the window 12 is bonded in place with a common optical adhesive 14 such as the UV curing adhesive Norland 61 when the micro-sphere is in best focus.

To provide focus at the proper depth after curing, the window 12 can be repositioned before curing the adhesive 14 to compensate for the shrinkage of the adhesive 14. The amount of pre-curing compensation is a function of the adhesive 14 properties, volume, and thickness, and the window 12 flexibility. A glass window 12 about 150 microns thick will flex and provide a slight depression in the center where a specimen can find protection from being crushed when a cover glass is added to protect the specimen from air and control the sample thickness. Protection from air and controlled sample thickness both enhance image quality.

Figure 2:
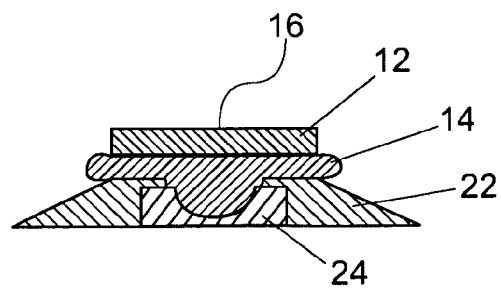
FIG. 2 is a partial section view of FIG. 1 showing the optical adhesive filling the gap between the plane parallel window and the last lens component in a standard emersion type objective.

FIG. 2 is a section view of FIG. 1 showing the optical adhesive 14 filling the gap between the plane parallel window 12 and the last lens component 24 of a standard emersion type objective lens.

Figure 3:
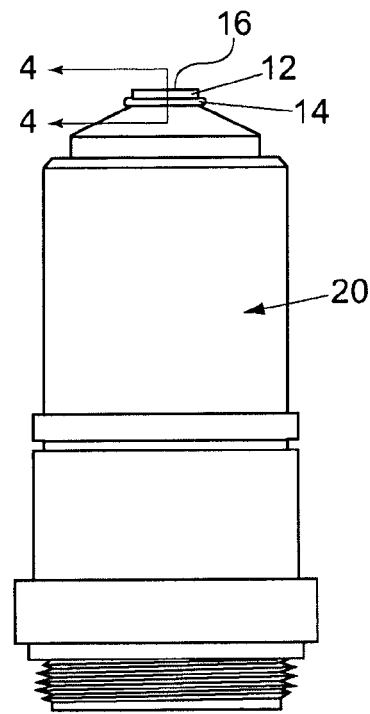
FIG. 3 is a side view of a 40× fixed focus objective constructed in accordance with the invention showing it built by modifying a common 40× microscope objective.
Figure 4:
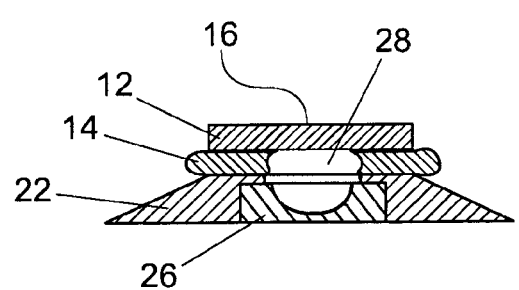
FIG. 4 is a partial section view of FIG. 3 showing the optical adhesive not filling the gap between plane parallel window and the last lens component in a standard type objective.

FIG. 3 is a side view of a standard 40× microscope objective 20 completed with a thin (approximately 150 micron thick) glass plane parallel window 12 that is fixed in place with an adhesive 14 leaving an air space 28 as shown in FIG. 4 to create the fixed focus microscope objective lens. The glass window 12 is located precisely at the focal plane of the lens 20 so that an image of an object placed on the window surface 16 is imaged at an infinite distance. It is necessary to place and affix the window 12 with extreme accuracy. The tolerance for error in this placement is no more than a few microns. This manufacturing step in the construction of the fixed focus microscope lens can be accomplished by positioning the window 12 while observing through the objective 20 an object such as a 5-micron diameter micro-sphere on the window surface 16 with a video camera system focused precisely at infinity. The window 12 position is actively aligned and the window 12 is bonded in place with a common optical adhesive 14 such as the UV curing adhesive Norland 61 when the micro-sphere is in best focus.

The fixed focus microscope objective lens can be manufactured by modifying any standard, and commercially available, microscope objective lens, but infinity-corrected objective lenses work the best with infinity-corrected eyepieces and cameras. Modifying off-the-shelf lenses helps reduce costs in manufacturing smaller numbers of fixed focus microscope objective lenses, however, the fixed focus objective lens concept can be applied to any lens design. In addition, the fixed focus objective lens can be manufactured economically with the employment of optical adhesives that allow active adjustment and positioning in real time while an image is being viewed through the lens.

FIG. 4 is a section view of FIG. 3 showing an air space 28 in the adhesive 14 attaching the plane parallel window 12 to the lens housing 22 and the last lens component 26 of a typical 40× microscope objective.

REFERENCE NUMERALS

12 plane parallel window
14 optical adhesive
16 window surface
18 standard 100× oil emersion microscope objective
20 standard 40× microscope objective
22 lens housing
24 the last glass lens component of a standard emersion type microscope objective
26 the last glass lens component of a standard microscope objective
28 air space between plane parallel window and lens

OPERATION

In operation the fixed focus objective lens is used in a microscope system. This system can be either for eye viewing or for camera viewing. Eyepieces designed for use with infinity corrected objectives should be used with the fixed focus objective lens. The eyepiece and the objective can be combined in a simple tube or the fixed focus objective can be used in a standard microscope turret. To see a magnified view of the specimen, a person simply applies the specimen to the objective surface, illuminates the specimen appropriately, and looks through the eyepiece.

Generally, a good image can also be captured with a camera looking into the fixed focus objective. The camera needs to utilize a telephoto lens so that the field of view roughly matches the field of the objective. Consumer video or still cameras that have an optical zoom of 10×, or more, work well with 100× or 40× fixed focus objectives. The camera should be held steady on a camera mount and pointed into the objective on a common optical axis. The simplest way to do this is to adapt the microscope objective mount to the mount provided on the camera lens normally used for optical filters. The specimen is applied to the last surface of the fixed focus objective lens where it is illuminated. The illumination source can be in a traditional Kohler configuration, but high contrast images can also be produced with light sources as simple as a flash light shining down on the sample from a distance of about 2 inches. An image of the sample is then available for capture with the camera.

The fixed focus microscope objective is best suited for viewing homogenous substances because it cannot be used to scan or search for areas of interest. However, there are many substances that are homogenous which frequently require inspection under high magnification. Examples of some frequently inspected homogeneous substances are blood, semen, and bacteria. In addition, if desired, the specimen can be moved about on the objective surface to provide additional views.

What I claim as my invention is:

1. A fixed focus microscope objective lens for high magnification of an immersed specimen, comprising:
    (a) a single or multi element microscope objective lens system,
    (b) a thin sheet of clear window material to serve as a mounting surface for said immersed specimen,
    (c) an optical adhesive for rigidly attaching said window material directly to said lens, and for fixing the distal surface of said window at a precise distance relative to the focus of said lens, and for creating on said window a slight depression in the center caused by the shrinkage of said optical adhesive after curing wherein said immersed specimen is protected from being crushed or compressed when a cover glass is added over said specimen.

* * * * *